United States Patent

[11] 3,550,766

[72] Inventors David Nixen
Anaheim;
Alvin B. Phillips, Newport Beach, Calif.
[21] Appl. No. 803,903
[22] Filed Mar. 3, 1969
[45] Patented Dec. 29, 1970
[73] Assignee North American Rockwell Corporation

[54] FLAT ELECTRONIC PACKAGE ASSEMBLY
5 Claims, 7 Drawing Figs.

[52] U.S. Cl. .......................................................... 206/46,
29/193, 29/193.5; 174/52; 206/56; 317/101, 317/234
[51] Int. Cl. .......................................................... H05k 5/00
[50] Field of Search .......................................................... 174/FP,
50.5, 50.6, 52.5; 317/101A, 101CP, 234/4, 234/5, 234/3.1; 206/56A, 46, 46Misc; 29/193, 193.5

[56] References Cited

UNITED STATES PATENTS

| | | | |
|---|---|---|---|
| 3,337,678 | 8/1967 | Stelmak........................ | 174/50.5X |
| 3,340,602 | 9/1967 | Hontz........................ | 174/FP |
| 3,404,319 | 10/1968 | Tsuji et al. ..................... | 174/FP |
| 3,416,348 | 12/1968 | Carters, Jr. et al.......... | 174/FP |
| 3,484,533 | 12/1969 | Kauffman..................... | 174/52(.5) |

*Primary Examiner*—Darrell L. Clay
*Attorneys*—L. Lee Humphries, Edward Dugas, H. Frederick Hamann and Robert G. Rogers

ABSTRACT: The package assembly is formed with a flat thin, metal support frame having a plurality of conductive leads extending inward towards the center of the frame. A flat insulating substrate, having an opening through its center and an electrical contact area arranged on one surface thereof, connecting points on the circumference of the opening to points of an outer edge of the insulating substrate. The insulating substrate is positioned such that the plurality of leads each connected to at least one electrical contact area near the outer edge of the insulating substrate. At least two support members extend from the frame to the insulating substrate to support the substrate in a fixed relationship with respect to the frame when the conductive leads are severed from the frame. A top plate of insulating material sandwiches the conducting areas from substantially the edge of the insulating substrate to the edge of the defined opening. The semiconductor device is inserted into the opening and secured to the contact areas. A flat heat sink is sealed to the insulating substrate to close the opening from the bottom. A ring is sealed to the second insulating substrate around the defined opening on the top. A cap is then sealed on the ring to effect a hermetic seal around the semiconductor device.

INVENTORS
DAVID NIXEN
ALVIN B. PHILLIPS
BY
Edward Dugas
ATTORNEY

INVENTORS
DAVID NIXEN
ALVIN B. PHILLIPS
BY
Edward Degas
ATTORNEY

INVENTORS
DAVID NIXEN
ALVIN B. PHILLIPS
BY Edward Dugas
ATTORNEY

FLAT ELECTRONIC PACKAGE ASSEMBLY

BACKGROUND OF THE INVENTION

The continued growth of electronics, both in quality and in quantity, has caused a noticeable change in the field of microelectronic packaging. Hermetic packages used today are basically composed of the conductors (metallic form) and the insulation. The insulation is either a glass body or a ceramic body. In the sealing of glass to metal, some residual strain remains in the glass body, no matter how close a match their thermal expansions may be. If the total of the residual strain exceeds the limit that the glass can stand, a cracked glass seal occurs which results in the total loss of the unit. With the price of semiconductor circuit devices increasing, it behooves the packaging manufacturer to increase the processing yields and the reliability of the completed package. Another factor which goes into the determination of the price of the particular device is the amount of labor necessary to test and handle the device before it is shipped to the customer. Various patents exist in the prior arts which attempt to solve these particular problems, One such patent of interest is U.S. Pat. No. 3,271,625, entitled "Electronic Package Assembly." In the device of that patent, a sheet of Kovar metal is punched to provide a plurality of spaced parallel strips which are maintained in this space relationship by integral connection with a frame which extends around the entire parameter of the electronic structure. The spaced parallel strips are then embedded in an insulating material such as glass. A central portion of the parallel strips is etched away and a semiconductor-type electronic circuit has its terminals connected to respective parallel strips. The electronic device is then sealed into place using a cover of glass. The frame which supported the electrodes (parallel strips) is then cut away so that the device can be electrically tested and prepared for insertion into larger systems. One of the major disadvantages attached to this particular type of packaging is that the parallel electrodes are each connected to a common frame which thereby prevents electrical testing of the device until the electrodes have been severed from the frame. Once the electrodes are severed from the frame, all physical support and protection for the electrodes is lost. Therefore, it is common practice in the industry to provide a support holder for each of the packages as it is severed from the remaining packages and the support frame. The cost of the support package is relatively high but even more important is that an additional labor step is necessary to place the package into the support frame. One of the major features of the present invention is that the frame is electrically dissassociated from the parallel electrodes to enable electrical testing of the device while the device is still fixed in the protective outer frame. Aside from eliminating the additional labor step, this particular arrangement facilitates automatic handling and testing of the device through the entire manufacturing process. The retention of the frame to substantially the end of the manufacturing process additionally provides physical protection for the parallel electrodes. The prior art step of severing the package from the protecting support frame is clearly shown in FIG. 7 of the aforementioned patent.

Another prior art device of interest is disclosed in U.S. Pat. No. 3,340,347 entitled "Enclosed Electronic Device." The device in that patent is somewhat similar to the aforementioned referenced device in that a frame interconnects each one of the parallel connectors, thereby preventing electrical testing until the frame is severed from the body and it is also similar in the fact that glass is used extensively as part of the package structure.

Another reference of interest is U.S. Pat. No. 3,341,649 entitled "Modular Package for Semiconductor Devices." The limitation present on that particular device is clearly shown in FIG. 6 where a large supporting outer frame interconnects each one of the parallel electrical leadout conductors and physically protects them during the manufacturing process but which is removed in order to enable electrical testing, thereby, exposing the leads to physical damage. Again, this particular package also makes extensive use of glass combined with a conducting material such as Kovar. The use of these two particular materials in combination substantially reduces the reliability of the device due to the fact that internal stresses are set up in the glass which may cause a leak.

In U.S. Pat. No. 3,374,537, entitled "Method of Connecting Leads to a Semiconductor Device," there is again shown in FIG. 2 for example the standard outer frame which is an integral part of the electrical parallel conductors which are connected to the monolithic microcircuit by means of film interconnections. Again, this particular device cannot be electrically tested for continuity until the outer frame is severed from the parallel conductors, which in turn, requires that the chip or package be supported in some sort of processing frame in order that the external leads remain undamaged.

One of the more recent patents of interest is U.S. Pat. No. 3,381,372, entitled "Method of Electrically Connecting and Hermetically Sealing Packages for Microelectronic Circuits." In FIG. 1 of that patent we again see the parallel conductors connected in unity with a support frame during a good portion of the manufacturing process. Once the frame has been severed from the parallel conductors, it is again necessary to place the package into some sort of test or handling fixture in order to further process and test the package prior to its use in a circuit or electronic system.

From the aforementioned discussion, it becomes obvious that it is highly desirable to retain the support frame around the periphery of the electronic package until it is ready for use on an electronic circuit board, for example. It is also desirable to have such a support system to facilitate automatic handling and testing of the package through the entire manufacturing process. An additional advantage, heretofore not mentioned, is the fact that alignment marks may be affixed to the outer frame during the manufacturing process and the alignment marks remain in a fixed orientation with respect to the package itself during the entire manufacturing process. This feature alone enables manufacture of extremely accurately positioned devices. It is obvious that once the supporting frame is severed from the package, a new index method must be found which index, of course, is subject to misalignments with respect to the original frame index.

SUMMARY OF THE INVENTION

The invention in a preferred embodiment is directed to a metal support frame having a plurality of conducting leads extending inwards towards the center of the frame with an electronic semiconductor circuit electrically connected to the leads at the center. Support tabs extend from the frame to the electronic circuit, or its housing, to provide support and alignment when the parallel conductors are severed from the metal frame. The supporting tabs are insulated from the electronic circuit thereby enabling electronic testing of the circuit through the parallel conductors while providing support and protection with the metal support frame. In more specific terms, the package assembly is formed with a flat, thin metal support frame having integral therewith a plurality of parallel conducting leads which extend inward towards the center of the frame. A flat insulating substrate, having an opening through its center and electrical conductors deposited on one surface thereof extending from the center opening to the outer periphery of the semiconductor is connected to the parallel conductors at points on its circumference. A microelectronic circuit is electrically connected to the deposited conductors at points around the defined opening. A second insulating substrate is sealed over the first insulating substrate to provide additional support for the deposited conductors. A highly thermal conductive material is used to seal the bottom of the defined opening with a cap of conductive material bonded to the second insulating substrate to form a hermetic seal around the microelectronic circuit.

Accordingly, it is an object of the present invention to provide an improved electronic package.

It is a further object of the present invention to provide an electronic package which is particularly adaptable to automatic machine handling.

It is another object of the present invention to provide an electronic package wherein the parallel conducting leads are protected, yet isolated for electronic testing, during the manufacturing process.

It is another object of the present invention which provides superior heat transfer properties, protection to electrical conductors, and reliability. The aforementioned and other objects of the present invention will become more apparent when taken in conjunction with the following description and drawings, throughout which like characters indicate like parts, and which drawings form a part of this application.

BRIEF DESCRIPTION OF THE EMBODIMENT

Figure 1:
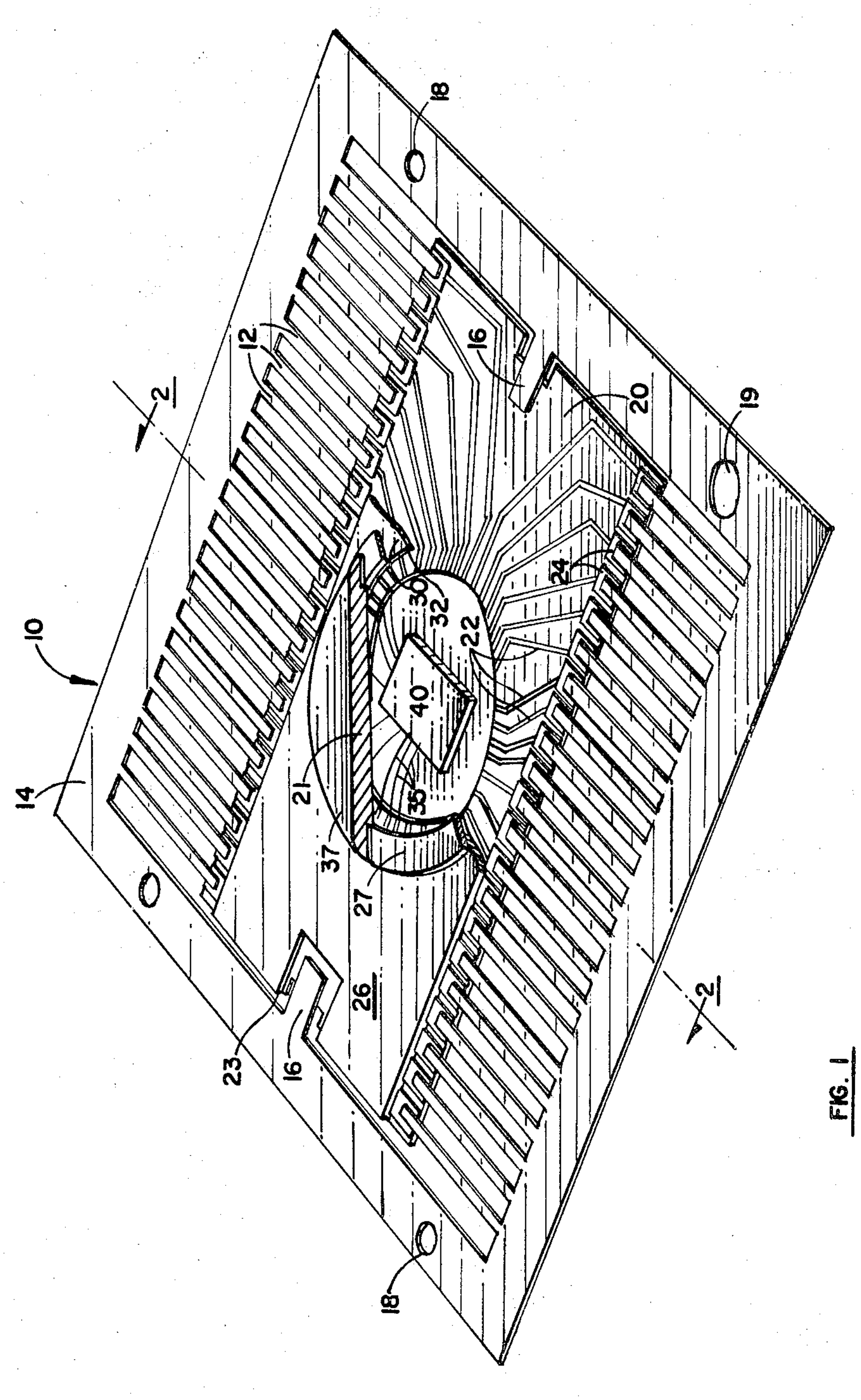
FIG. 1 is a top plan view partially cut away of the preferred embodiment.
Figure 2:
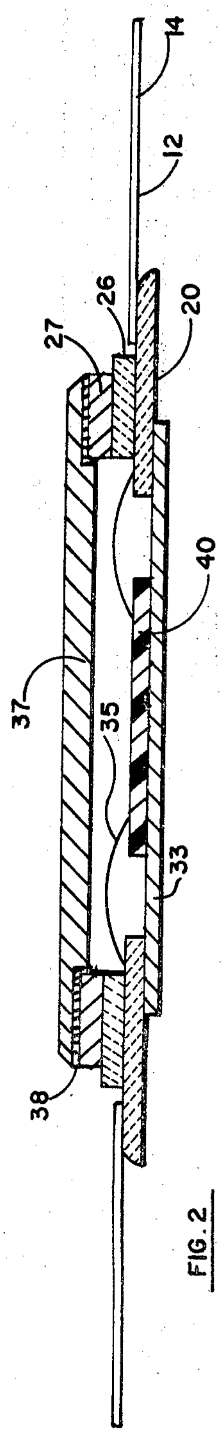
FIG. 2 is a section view of the embodiment of FIG. 1 taken along the section line 2–2.

Referring to FIG. 1, an electrode structure 10 is formed from any suitable conducting material, but ideally Kovar is the material used due to its desirable thermal expansion characteristics. A sheet of Kovar is punched as shown to provide a plurality of extending spaced parallel conductors 12 which are maintained in a predetermined spaced relationship by a remaining outer support frame 14 which extends around the entire parameter of the packaging structure. Two additional support tabs 16 extend laterally inward from the frame 14 in a direction substantially perpendicular to that of the conductors 12. Holes 18 in the frame 14 provide for initial alignment of the frame with respect to components that will later be mounted in or to the package. An additional index opening 19 provides a key which enables the package to be reinserted in its original orientation if for some reason it must be taken from the process line during manufacture. Various other methods of indexing, such as notching, color coding, scribe lines may be used without detracting from the scope of the invention. A flat, rectangular wafer of a dielectric material, preferably ceramic 20, has a circular opening 21 defined therein. The opening may be of any desired shape but it has been found that a circular opening is by far the best in that there are no particular corners involved which increase the stresses in the semiconductor material which may later cause a leak or other type of failure in the package. Deposited on one surface of the ceramic straight 20 is a plurality of film-type electrical conductors 22 which extend across the surface of the ceramic plate from points on the circumference of the defined opening 21 to the outer edges of the ceramic plate. The metal conductors 22 may be deposited by any known standard technique such as the presently well used metallization techniques. At the same time that the conductor strips are being deposited, two additional pads of conducting material are deposited at areas 23 to provide a future fusion point for the metal support tabs 16. The metal diffused areas 23 are electrically isolated from all other conducting portions on the ceramic substrate 20. The electrical conductors 22 terminate at the outer surface of the pad 20 in oversized pad areas 24 to facilitate bonding to the parallel conductors 12. A second ceramic flat, rectangular sheet 26 sandwiches the conductors 22 to the bottom ceramic plate 20 and is affixed in place by well-known ceramic taping techniques or by any other suitable bonding process. The upper surface of the second insulating plate 26 has deposited on it a metallized area 30 which forms a ring around the defined opening 32. A washer 27, preferably of Kovar material, is sealed to the metallized surface 30. A circular disc or high thermal conductivity material, again such as Kovar, 33 is affixed to the bottom ceramic plate 20, sealing the opening 21. A microelectronic circuit 40 is then attached by any well-known technique into the defined opening 21 and its electrical leads 35 are connected to the respective conductors 22 along the periphery of the defined opening. A cap member 37 is then hermetically sealed to the Kovar ring 27.

Figure 4A:
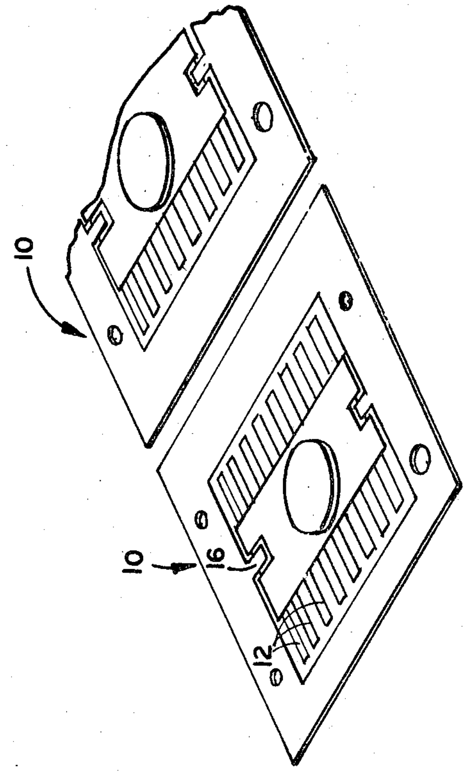
FIG. 4*a* is an isometric view showing the severance of the conductors from the frame.
Figure 3:
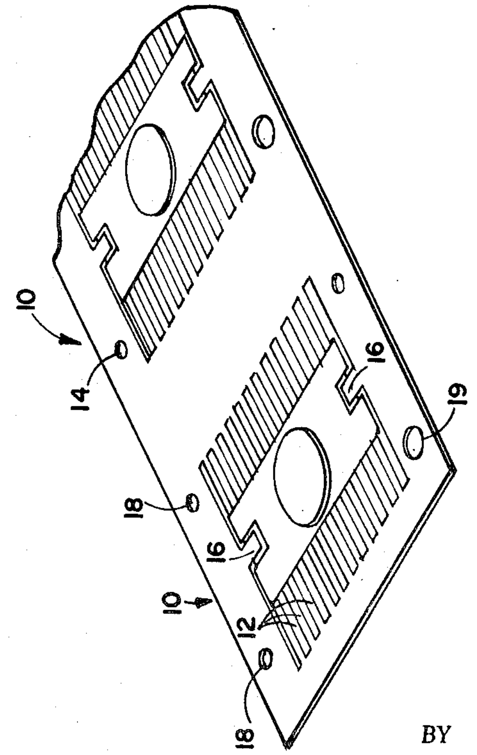
FIG. 3 is an isometric view of a plurality of frames connected to the hermetically sealed package.
Figure 4B:
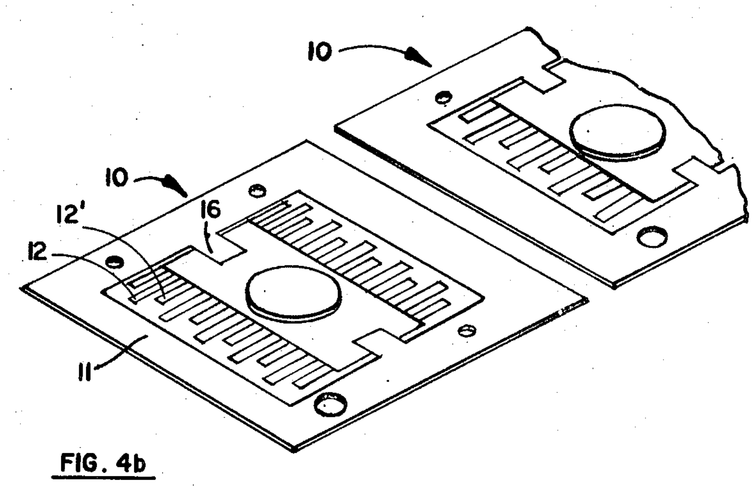
FIG. 4*b* illustrates a second embodiment of the separation of the leads from the support frame.
Figure 5A:
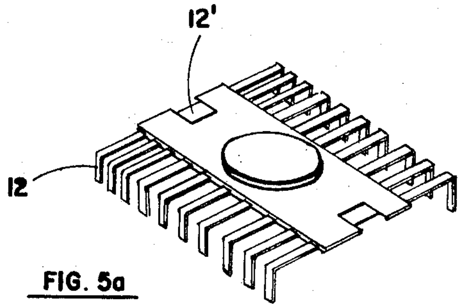
FIG. 5*a* is an isometric view of the completely severed device of FIG. 4*a* with leads bent, ready for insertion into a circuit board.
Figure 5B:
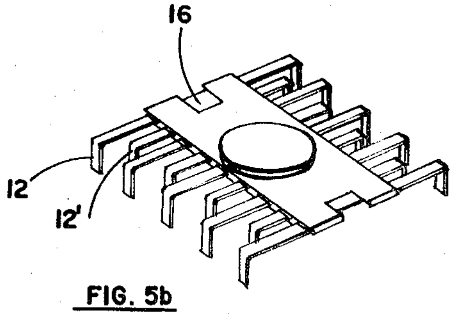
FIG. 5*b* is an isometric view of the package of FIG. 4*b* completely severed from the supporting frame with the leads bent in an alternate fashion ready for mounting to a circuit board.

Referring now to FIG. 3, two electronic packages 10 are shown connected together through their respective support frames 14. In actual production these connections may be, for example, strips of six or seven frames interconnected or they may be continuous sheets of support frames. The package at this stage is supported both by the electrical conductors 12 and by the support tabs 16. Indexing holes 18 and 19 may or may not be inserted at this particular time. FIG. 4*a* illustrates the separating step which severs the electrical conductors 12 from the supporting frame 14. The package is then held in place solely by the support tabs 16. At the time of severing the electrical conductors it may also be desirable to sever each of the respective packages 10 from an adjacent package. Electrical testing can now be accomplished using automatic machines probing from either the top or the bottom into the electric conductors to determine the state of the electronic package 40. In FIG. 4*a* the electrical conductors 12 are severed at substantially the same length. In FIG. 4*b* there is shown an alternate method, that of cutting every second conductor shorter than its neighbor. In FIG. 5*a*, the electronic package is completely severed from the protecting frame 14 and the leads which were cut to the same length, as is the case for the device shown in FIG. 4*a*, are all bent along the same line ready for insertion into a circuit board. In FIG. 5*b*, which is the device of FIG. 4*b* severed from the support frame 14, the leads are bent to provide a two-row interconnection. In some circuit applications, this is a desired form of mounting due to the increased spacing between the conductors where they intersect the circuit board and to increased structural rigidity of the total mounting.

From the foregoing discussion it can be seen that the electronic package of the present invention is a highly versatile and reliable package in that it can be manufactured, using almost exclusively mechanical handling devices. It may then be shipped to the final user with the support frame 14 in place protecting the conductive leads. The device can be completely electrically tested while in the support frame and can be easily severed from the frame for use by unskilled labor when desired. The alternate arrangement of staggered lengths of the leads provides a versatile mounting device. The relative flatness of the package again enhances its machine adaptability. With the use of temperature stable material, materials such as ceramic and Kovar exclusively throughout the device, a highly reliable device is formed. Also, with the second ceramic insulating layer 26 sandwiching the sensitive conducting lines 22 except at the points where necessary to connect either to the microelectronic circuit or to the electrical conductors 12, a rugged device is also achieved.

While there has been shown what is considered to be the preferred embodiments of the present invention, it will be manifest that many changes and modifications may be made therein, without departing from the essential spirit of the invention. It is intended, therefore, in the annexed claims, to cover all such changes and modifications as may fall within the true scope of the invention.

I claim:

1. An article of manufacture, a package for an electronic circuit comprising:

a substantially flat lead frame having a plurality of parallel electrical conductors projecting inward towards the center of said frame;

an insulating housing including means for receiving an electronic circuit, said housing having a pattern of conductors extending from the outer edges thereof to said means for receiving said electronic circuit, said pattern of conductors including first conductor terminations adjacent to the means for receiving said electronic circuit for permitting electrical connections between the pattern of conductors and the electronic circuit, said second conductor terminations mating with and connected to the inwardly projecting terminations of said parallel electrical conductors for providing electrical continuity between said plurality of parallel electrical conductors and said pattern of conductors; and support tab means extending from said lead frame towards the center of said lead frame, said support tab means connected to said housing and insulated from said pattern of conductors providing support to said housing when said parallel electrical conductors are severed from said lead frame to enable said electronic circuit to be electrically tested without completely disconnecting the housing from said lead frame whereby after the electronic circuit is tested the package is usable for shipping the electronic circuit.

2. The invention according to claim 1 wherein said tabs project inward from said lead frame perpendicular to said parallel electrical conductors and said housing being positioned substantially in the center of said lead frame.

3. The package recited in claim 1 wherein said insulating housing is comprised of:

a first flat rectangular insulating substrate having an opening coincident with the locations of said means for receiving said electronic circuit, said first terminations being adjacent to said opening;

said pattern of conductors comprising electrical connectors deposited on said substrate, said connectors extending from the periphery of said opening to the outer edges of said insulating substrate;

a second flat rectangular insulating substrate disposed over said first insulating substrate and sealing said pattern of conductors, the peripheral dimensions of said second substrate being less than the peripheral dimensions of said first substrate exposing said second terminations of the conductor pattern for making electrical connections to said plurality of parallel electrical conductors, said first substrate also including metallic layers mating with said support tab means and connected thereto for securing said tab means to said insulating housing, said metallic layers being insulated from said pattern of conductors, said second substrate having an opening exposing said first terminations and permitting access to the opening of said first substrate;

a thermally conducting plate connected to said first substrate on the side opposite said second substrate and sealing one end of said opening of said first substrate; and said metallic washer bonded to said second substrate on the side opposite said first substrate and surrounding said opening of said second substrate to which a cover may be attached to hermetically seal said opening after the electronic circuit has been placed in said opening and electronically connected to said second terminations.

4 The invention according to claim 3 wherein both of said openings are circular and wherein both of said insulating substrates are formed from ceramic material and wherein said metallic washer, said lead frame and said thermally conducting plate are made from an alloy comprising nickel, iron and cobalt.

5. A package for an electronic circuit comprising:

A substantially flat lead frame having a plurality of parallel electrical conductors projecting inward towards the center of said frame, said plurality of parallel electrical conductors being severed from said lead frame;

an insulating housing including means for receiving an electronic circuit, said housing having a pattern of conductors extending from the outer edges thereof to said means for receiving said electronic circuit, said pattern of conductors including first conductor terminations adjacent to the means for receiving said electronic circuit for permitting electrical connections between the pattern of conductors and the electronic circuit, and second conductor terminals mating with and connected to the inwardly projecting terminations of said parallel electrical conductors for providing electrical continuity between said plurality of parallel electrical conductors and said pattern of conductors;

an electronic circuit disposed in said means for receiving said electronic circuit and electrically connected to said first conductor terminations, covering means hermetically sealing said electronic circuit in said means for receiving said electronic circuit; and support tab means extending from said lead frame towards the center of said lead frame, said support tab means connected to said housing and insulated from said pattern of conductors providing support to said housing to enable said electronic circuit to be electrically tested without completely disconnecting the housing from said lead frame whereby after the electronic circuit is tested, the package is usable for shipping the electronic circuit.